UNITED STATES PATENT OFFICE.

RICHARD WILLSTÄTTER, OF MUNICH, GERMANY, ASSIGNOR TO THE FIRM OF E. MERCK, OF DARMSTADT, GERMANY.

TROPIN KETONE AND PROCESS OF MAKING SAME.

SPECIFICATION forming part of Letters Patent No. 628,293, dated July 4, 1899.

Application filed May 25, 1897. Serial No. 638,086. (Specimens.)

*To all whom it may concern:*

Be it known that I, RICHARD WILLSTÄTTER, a subject of the Emperor of Germany, residing at Munich, Bavaria, in the German Empire, have invented and discovered a new Group of Chemical Compounds and Process for Producing the Same, of which the following is a full, clear, and exact specification.

I have discovered that a new group of chemical bodies, which I call "keto-tropins" and which are true ketones of bodies of the tropin group—for instance, of tropin, of pseudotropin, or of tropigenin—can be obtained by cautious and slow oxidation of such bodies with only just the requisite equivalent amounts of chromium trioxid, ($CrO_3$,) preferably in solution with glacial acetic acid or sulfuric acid at a slightly-elevated temperature. The chromium trioxid giving up one-half of its oxygen in this reaction, the requisite equivalent of it is one molecule for every one and one-half molecules of the tropin body to be acted upon, which amount of the latter then loses a total of three atoms of H, being 2H per molecule of the tropin body, thus oxidizing the latter to a ketone.

In the case of my invention being applied to tropin itself the structure of the parent substance and that of the ketone derived from it by my process are shown in the following diagrams:

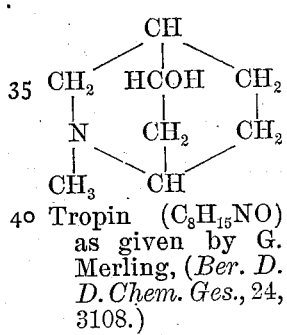
Tropin ($C_8H_{15}NO$) as given by G. Merling, (*Ber. D. D. Chem. Ges.*, 24, 3108.)

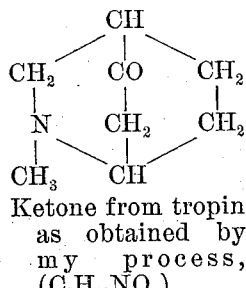
Ketone from tropin as obtained by my process, ($C_8H_{13}NO$.)

Hitherto it had not been found possible to obtain a ketone of substances of the tropin group. Tropin itself, which according to G. Merling (*Ber. D. D. Chem. Ges.*, 24, 3108) possesses the following constitution:

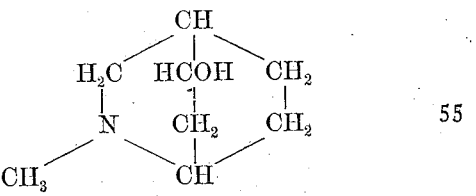

on being gently oxidized with potassium permanganate yielded the corresponding base, demethylated at the nitrogen connection— to wit, tropigenin (Merling, *Ann. D. Chem.*, 216, 340.) On the other hand, when oxidized with chromic acid it formed by a breaking up of the ring system common to the tropin compounds a dicarboxylic acid of the composition $C_8H_{13}NO_4$—to wit, tropinic acid, (Merling, as above, p. 348)—and as a by-product the so-called "ecgoninic acid," ($C_7H_{11}NO_3$.) (C. Liebermann, *Ber. D. D. Chem. Ges.*, 23, 2518, and 24, 606.) Nevertheless I have found that from tropin may be obtained the corresponding ketone in excellent yield if the tropin is subjected to the action of but precisely the theoretically requisite amount of chromic acid—to wit, one molecule of $CrO_3$ to one and one-half molecules of tropin— which action takes place best under the influence of gentle heat and in a solution made with glacial acetic or sulfuric acid.

The ketone from tropin obtained by me as above outlined combines the properties of a basic substance and of a ketone. It melts at 41° to 42° centigrade and boils at 224° to 225° centigrade, (corr.) Its chlorhydrate is very readily soluble in water, difficultly in cold alcohol, and melts at 189° centigrade, with decomposition. Its picrate melts at 220° centigrade, with decomposition; its platinum double salt at 191° to 192° centigrade, with decomposition; its oxim at 111° to 112° centigrade, and its iodo-methylate at 263° to 265° centigrade, with decomposition.

An example of the manufacture of the above-described member of my newly-discovered group of ketones from the tropin group is as follows: Dissolve one hundred grams of tropin in two kilograms of glacial acetic acid, heat to 60° or 70° centigrade, and keep temperature thus during the following stage: Add to this solution by drops and while continually stirring with a turbine a solution of forty-eight grams of chromium trioxid in fifty grams of water and two hundred and fifty grams of glacial acetic acid. When this oxidizing solution has all been added, heat the mixture for a brief time to 100° centigrade. Then add a concentrated aqueous solution of caustic soda in excess. From the mixture thus rendered alkaline the product—tropin ketone—may then be separated by distilling with steam or preferably by repeated shaking with ether and evaporating the ethereal solution thus gained. The crude product thus obtained may readily be rendered chemically pure by repeated distillation. The ketone thus obtained from tropin passes on distillation as a colorless liquid, which on cooling solidifies in a mass of acicular crystals resembling carbolic acid. On exposure to air it gradually assumes a brownish color. From a warm concentrated ethereal solution it separates in colorless needles, which only turn yellowish on prolonged keeping. The yield is over eighty per cent. of the calculated amount.

In the same manner as above described a ketone may be derived from another member of the tropin group—to wit, from pseudotropin, an isomer of tropin discovered by C. Liebermann, (*Ber. D. D. Chem. Ges.*, 24, 2336.) The ketone from pseudotropin is found to be wholly identical with that from tropin.

The same procedure as used for the production of the above ketone will likewise produce ketones from still other members of the tropin group—as, for instance, from tropigenin, ($C_7H_{13}NO$,) the next lower homologue of tropin, being tropin deprived of one methylene from the side chain attached to the N atom. The cautious employment of only the exact theoretical equivalent of chromium trioxid is, as in the previous cases, essential. The result in this case will be likewise a substance deprived of two of the hydrogen atoms of the mother substance, so as to leave the "CO" group in the middle chain bare, as before.

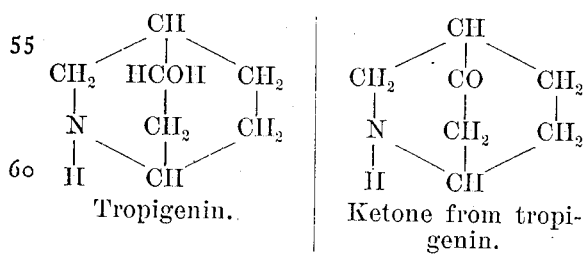

Tropigenin.   Ketone from tropigenin.

This ketone ($C_7H_{11}NO$) melts at 69° to 70° centigrade, and it attracts carbonic acid and moisture from the atmosphere with avidity. Its chlorhydrate is very readily soluble in water, difficultly in alcohol, and melts at 201° centigrade, with decomposition. Its carbamate melts at 110° to 111° centigrade, its gold double salt at 168° centigrade, with decomposition, and its oxim at 181° to 182° centigrade. The ketone thus obtained from tropigenin when it is isolated from its ethereal solution by evaporation with the aid of heat, or when it is distilled *in vacuo*, appears at first as a colorless oily liquid, which on cooling solidifies, forming a snow-white crystalline mass, which is soluble in most of the usual solvents, but not in ligroin. It can be precipitated from solutions by the addition of ligroin, whereby it is obtained in colorless leaflets.

An example of the manufacture of the tropigenin ketone is as follows: Dissolve one hundred grams of tropigenin carbamate in two kilograms of glacial acetic acid. Heat to 55° to 65° centigrade and keep at that temperature during the next stage. Add, by drops, while stirring, a solution of forty-five grams of chromium trioxid in forty-five grams of water and two hundred and twenty-five grams of glacial acetic acid. Then cooling the mixture add an excess of concentrated aqueous solution of caustic soda. The tropigenin ketone thus produced is separated from the alkaline mixture by tenfold extraction, with each time two liters of ether. The ethereal solution is freed from what water it may contain, and the product is then obtained in the solid state by evaporation. The purification of the product may be still better performed by passing carbon dioxid gas through its above ethereal solution, whereupon crystallized carbamate of the tropigenin ketone separates out.

The several ketones obtainable, as before described, from bodies of the tropin group are generally characterized by their giving very sharply the general class reactions both of bases and of ketones—to wit, they form mists in the proximity of chlorhydric gas, expel ammonia from its salts, precipitate hydrated oxid from metallic salts—as, for instance, copper sulfate, ferric chlorid, aluminum sulfate—which precipitated hydrated oxids are not dissolved by an excess of the precipitant. They further form precipitates with phosphomolybdic acid, picrates with picric acid, double salts with auric and platinic chlorids, oxims with hydroxylamin, nitriles with hydrocyanic acid, and hydrazones with hydrazins. Being distilled *in vacuo*, they pass over as colorless liquids, which on cooling solidify in the shape of a crystalline mass, colorless while fresh. These several ketones of tropin bodies, as well as salts and the alkalized and acylized derivatives of such ketones, are especially adapted for medicinal uses. These uses are not, however, exercised directly by employing the keto-tropins in the form in which they are produced in this invention; but for the purpose of medicinal employment these keto-tropins forming the subject of my invention are first converted, by synthetic processes based on well-known principles, into tropacocain, (benzoylpseudo-tropin,) whose medicinal virtues are described in *Therapeutische Wochenschrift*, No. 9, of 1896, as per abstract reprinted in *Merck's Digest*, No. 2.

What I claim is—

1. A new product, being ketones of tropin bodies, and chemically characterized as tropin bodies deprived of two atoms of hydrogen from the middle chain, leaving the ring system of the respective tropin body unchanged; and which product is further characterized by giving very sharply the general class reactions both of bases and ketones; to wit, it forms mists in the proximity of chlorhydric gas, expels ammonia from its salts, precipitates hydrated oxids from metallic salts, as for instance copper sulfate, ferric chlorid, aluminum sulfate, which precipitated hydrated oxids are not dissolved by an excess of the precipitant; it further forms precipitates with phospho-molybdic acid, picrates with picric acid, double salts with auric and platinic chlorids, oxims with hydroxylamin, nitriles with hydro-cyanic acid, hydrazones with hydrazins; being distilled *in vacuo* it passes over as a colorless liquid which on cooling solidifies in the shape of a crystalline mass colorless while fresh.

2. As a specific instance of a new product, being ketones of tropin bodies, the particular ketone of tropin, combining ketonic and basic properties, melting at 41° to 42° centigrade, boiling at 224° to 225° centigrade (corr.); whose chlorhydrate is very readily soluble in water, difficultly in cold alcohol, and melts at 189° centigrade, with decomposition; whose picrate melts at 220° centigrade, with decomposition; whose platinum double salt melts at 191° to 192° centigrade, with decomposition; whose oxim melts at 111° to 112° centigrade; and whose iodo-methylate melts at 263° to 265° centigrade, with decomposition.

3. The process of manufacturing ketones of tropins (that is, of oxidizing tropin bodies just so much only, as to make each molecule thereof lose two atoms of hydrogen,) which process consists in adding in the presence of acetic acid, at a medium temperature, to a tropin body cautiously by small instalments, and with constant mechanical agitation, chromium trioxid in no greater total amount than exactly two-thirds of the calculated molecular equivalent of the tropin body; then briefly heating only just up to 100° centigrade on a water-bath; then, after cooling, neutralizing the acids contained in the mass with fixed alkali; then separating the product, to wit, the ketone of the body from the alkalized mass by physical means.

RICHARD WILLSTÄTTER.

Witnesses:
EMIL HENZEL,
EMIL ULMANN.